United States Patent
Simpson et al.

(10) Patent No.: US 7,085,807 B2
(45) Date of Patent: Aug. 1, 2006

(54) SYSTEM AND METHOD FOR PROVIDING LINKS TO AVAILABLE SERVICES OVER A LOCAL NETWORK BY A THIN PORTAL SERVICE CONFIGURED TO ACCESS IMAGING DATA STORED IN A PERSONAL IMAGING REPOSITORY

(75) Inventors: Shell S. Simpson, Boise, ID (US); Ward S. Foster, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 749 days.

(21) Appl. No.: 09/874,479

(22) Filed: Jun. 4, 2001

(65) Prior Publication Data

US 2002/0184370 A1 Dec. 5, 2002

(51) Int. Cl.
*G06F 15/16* (2006.01)

(52) U.S. Cl. .................. 709/203; 709/219; 709/224; 709/229; 707/3; 725/112; 715/501.1; 715/738

(58) Field of Classification Search .............. 709/201, 709/203, 217, 219, 227, 232, 224, 226, 229; 707/3; 715/501.1, 738; 725/112
See application file for complete search history.

(56) References Cited

U.S. PATENT DOCUMENTS

| | | | |
|---|---|---|---|
| 6,112,228 A * | 8/2000 | Earl et al. .................. 709/205 |
| 6,144,997 A | 11/2000 | Lamming et al. ............ 709/217 |
| 6,230,196 B1 * | 5/2001 | Guenthner et al. .......... 709/223 |
| 6,502,191 B1 * | 12/2002 | Smith et al. ................. 713/201 |
| 6,532,368 B1 * | 3/2003 | Hild et al. ................... 455/515 |
| 6,571,095 B1 * | 5/2003 | Koodli ..................... 455/435.1 |
| 6,610,105 B1 * | 8/2003 | Martin et al. ............... 715/513 |
| 6,633,757 B1 * | 10/2003 | Hermann et al. ......... 455/414.1 |
| 6,674,453 B1 * | 1/2004 | Schilit et al. ................ 345/810 |
| 6,757,262 B1 * | 6/2004 | Weisshaar et al. ........... 370/310 |
| 6,895,444 B1 * | 5/2005 | Weisshaar et al. .......... 709/250 |
| 2001/0034771 A1 * | 10/2001 | Hutsch et al. .............. 709/217 |
| 2001/0056502 A1 * | 12/2001 | Hollstrom et al. .......... 709/250 |
| 2002/0075812 A1 * | 6/2002 | Corwin ........................ 370/254 |
| 2002/0103813 A1 * | 8/2002 | Frigon ..................... 707/104.1 |
| 2002/0111848 A1 * | 8/2002 | White .......................... 705/10 |
| 2002/0138279 A1 * | 9/2002 | Al-Kazily et al. .............. 705/1 |
| 2002/0163895 A1 * | 11/2002 | Haller et al. ................. 370/335 |
| 2002/0174206 A1 * | 11/2002 | Moyer et al. ................ 709/221 |
| 2003/0006911 A1 * | 1/2003 | Smith et al. ................. 340/988 |
| 2003/0208522 A1 * | 11/2003 | McDonnell et al. ......... 709/201 |
| 2003/0208595 A1 * | 11/2003 | Gouge et al. ................ 709/225 |

* cited by examiner

Primary Examiner—Saleh Najjar
Assistant Examiner—Oanh Duong (57) ABSTRACT

A system and method for providing links to services available to an operably connected local computer over a network. The present invention includes a thin portal service for finding services available to the local computer, a thin portal service web content created by the thin portal service for returning links to the discovered available services, and a web browser installed on the local computer for displaying the thin portal service content.

21 Claims, 6 Drawing Sheets

SYSTEM AND METHOD FOR PROVIDING LINKS TO AVAILABLE SERVICES OVER A LOCAL NETWORK BY A THIN PORTAL SERVICE CONFIGURED TO ACCESS IMAGING DATA STORED IN A PERSONAL IMAGING REPOSITORY

The present invention generally relates to an improved system and method for providing links to services available over a network. More specifically, it relates to an improved system and method for providing links to services available to an operably connected local computer over a network.

Since laptop computers are designed for traveling and generally are not intended to rest in one particular location, users will often face a situation in which they must utilize services on a connected network system that have not been configured for use with their laptop computers. Typically, users cannot utilize the services available on a given network environment without prior configuration of these services on the laptop computer by a network administer. However, this greatly limits the potential mobility and flexibility of using a laptop computer and undesirably consumes valuable memory. Consequently, it would be a great benefit if users could utilize services available to the laptop computer once connected to a given network environment, in which the laptop computer is configured to find services that may provide imaging data or make use of imaging data belonging to the user. It should be noted that the term "imaging data" as read herein refers to any data format capable of being represented graphically, such as a Portable Document Format PDF file or a Joint Photographic Experts Group ("JPEG") file.

BRIEF SUMMARY OF THE INVENTION

The present invention is directed to an improved system and method for providing links to services available to an operably connected local computer. More particularly, the present invention relates to a system and method for providing links to services available to an operably connected local computer over a network.

The present invention provides a system that includes a thin portal service for finding services available to the local computer, a thin portal service web content created by the thin portal service for returning links to the discovered available services, and a web browser installed on the local computer for displaying the thin portal service content.

The present invention further provides a method that includes the steps of finding services available to the local computer, creating a thin portal service web content for returning links to the discovered available services, and displaying the thin portal service content on the local computer.

GLOSSARY OF TERMS AND ACRONYMS

The following terms and acronyms are used throughout the detailed description:

Client-Server. A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on the computer of a user; the program which responds to browser requests by serving Web pages, or other types of Web content, is commonly referred to as a "Web server."

Composition store. Composition store refers to a network service or a storage device for storing imaging composition(s) that can be accessed by the user or other web services.

Content. A set of executable instructions that is served by a server to a client and that is intended to be executed by the client so as to provide the client with certain functionality. Web content refers to content that is meant to be executed by operation of a Web browser. Web content, therefore, may non-exhaustively include one or more of the following: HTML code, SGML code, XML code, XSL code, CSS code, Java applet, JavaScript and C-"Sharp" code.

Exchange infrastructure. An exchange infrastructure is a collection of services distributed throughout a network that stores imaging data associated with a particular user through a user profile.

HTML (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to display the document. Additionally in specifying how the Web browser is to display the document, HTML tags can be used to create links to other Web documents (commonly referred to as "hyperlinks"). For more information on HTML, see Ian S. Graham, The HTML Source Book, John Wiley and Sons, Inc., 1995 (ISBN 0471-11894-4).

HTTP (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

Hyperlink. A navigational link from one document to another, from one portion (or component) of a document to another, or to a Web resource, such as a Java applet. Typically, a hyperlink is displayed as a highlighted word or phrase that can be selected by clicking on it using a mouse to jump to the associated document or document portion or to retrieve a particular resource.

Hypertext System. A computer-based informational system in which documents (and possibly other types of data entities) are linked together via hyperlinks to form a user-navigable "web."

Imaging composition. An imaging composition comprises links to imaging data serviced as a single unit.

Imaging data. Imaging data refers to digital data capable of being represented as two dimensional graphics, such as a Portable Document Format ("PDF") file or a Joint Photographic Experts Group ("JPEG") file.

Imaging data store. Imaging data store refers to a network service or a storage device for storing imaging data that can be accessed by the user or other network services. The imaging data store preferably accepts the imaging data in multiple standard file formats, and the imaging data is converted into these file formats when necessary depending on the implementation.

Internet. A collection of interconnected or disconnected networks (public and/or private) that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

PDA (Personal Digital Assistant). A small hand-held computer used to write notes, track appointments, email and web browser with generally with far less storage capacity than a desktop computer.

Personal imaging repository. A personal imaging repository is a conceptual term describing the exchange infrastructure used to exchange imaging composition and imaging data with web services. Users are associated with their imaging data through user profiles.

Thin Portal Service. A service, among other things, that finds the services available over a network that the local computer had connected with, which the links to these discovered available services are provided to the user.

URL (Uniform Resource Locator). A unique address which fully specifies the location of a file or other resource on the Internet or a network. The general format of a URL is protocol://machine address:port/path/filename.

User Information. User information is identification and security information used in accessing imaging composition(s) and imaging data associated with a particular user profile. It is preferably accessed either directly or indirectly through methods provided by an extension component integrated into the web browser.

World Wide Web ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Site. A computer system that serves informational content over a network using the standard protocols of the World Wide Web. Typically, a Web site corresponds to a particular Internet domain name, such as "HP.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users. Importantly, a Web Site can have additional functionality, for example, a Web site may have the ability to print documents, scan documents, etc.

DETAILED DESCRIPTION

Broadly stated, the present invention is directed to an improved system and method for providing links to services available to an operably connected local computer over a network. The system and method provide a way for a computer, once connected to a network, to find services that are available over the network and display the discovered available service in a web content to the user's browser. As a result, users can utilize services available to the laptop computer once connected to the given network environment.

Figure 1:
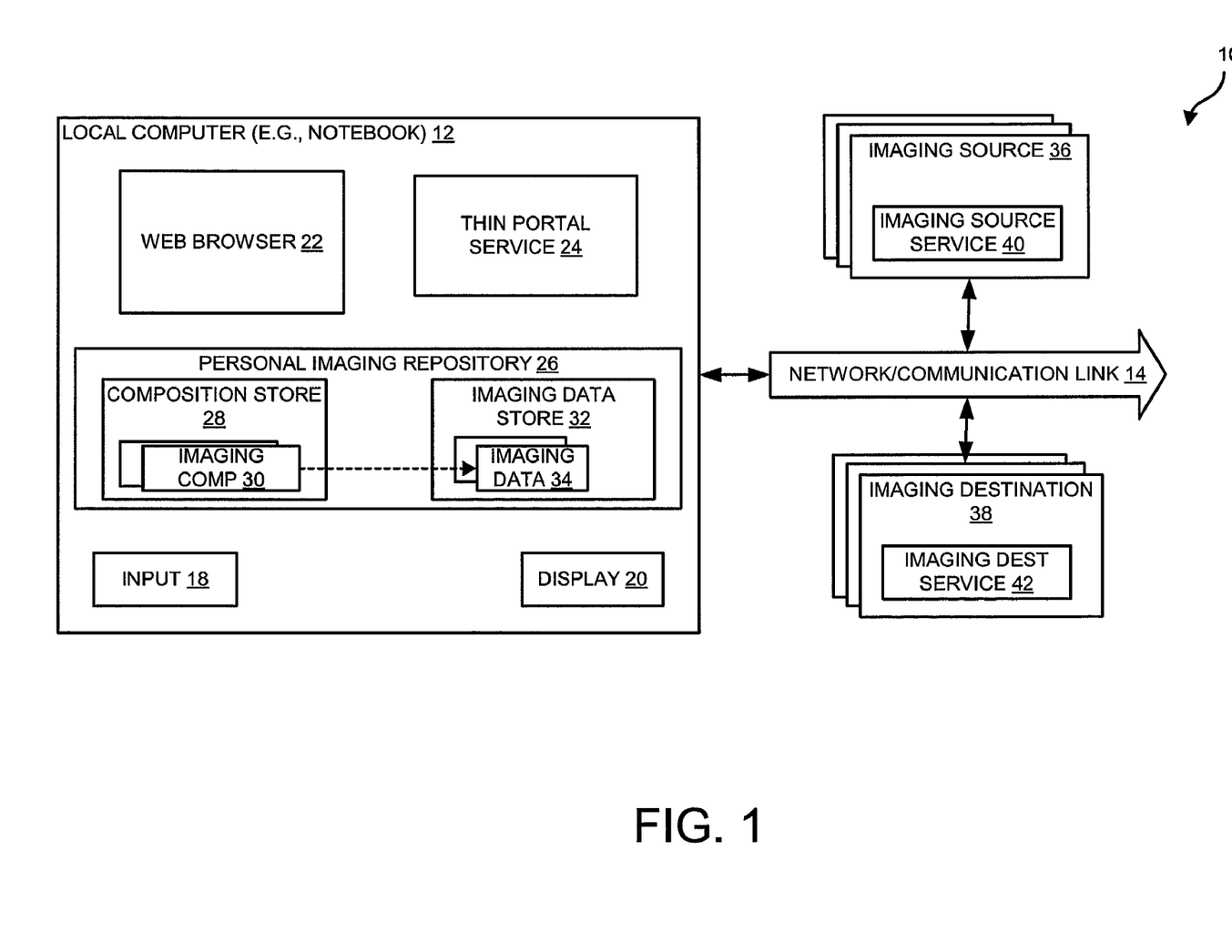
FIG. 1 is an overall diagram of a network system in which the present invention can be implemented.

An overall diagram of a network system in which the present invention can be implemented is shown in FIG. 1 and indicated generally at 10. Because there are numerous ways of implementing the network topology of the present invention, the current preferred network system is just one way to implement the present invention. As a result, it should be understood that other network topologies are contemplated and are within the scope of the present invention.

In the preferred embodiment, a local computer 12 operably connected to a network/communication link 14 contains the typical components of a general computer, such as an input interface 18 and a display interface 20. In addition, the local computer 12 preferably further includes a web browser 22, a thin portal service 24 and a personal imaging repository 26. As it is well-known in the art, the web browser 22 is a browser for displaying pages of a web content, such as web pages in Hypertext Markup Language ("HTML") or Extensible Markup Language ("XML"). On the other hand, the thin portal service 24, which is an important aspect of the present invention, provides links to services available over a network once connection is established by the local computer 12. In other words, once the local computer 12 connects with the network/communication link 14, the user can request the thin portal service 24 to find the available services provided on the network, and the links to the discovered available services are displayed to the user on the web browser 22.

The personal imaging repository 26 includes a composition store 28 for storing imaging composition(s) 30 of the imaging data that are serviced as a single unit and an imaging data store 32, i.e., digital memory, for storing the imaging data 34. An imaging composition 30 preferably contains links to the imaging data, which can be located at another web service's site. As a result, the composition store 28 stores only the imaging compositions 30. The imaging data store 32, on the other hand, is any imaging data store located on any computer that contains the imaging data 34. More specifically, each web service can have its own imaging data store 32 available to the public.

For example, at some previous time, a user may have printed an article from a web service site, resulting in an imaging composition 30 being created and stored in the user's composition store 28. The imaging composition 30 contains only the link to the imaging data 34 for this article stored on the web service site 36. Consequently, the imaging data 34 for the article is not in the imaging data store 32 located on the local computer 12. Rather, the imaging data 34 is stored in the imaging data store 32 located on the web service site 36. Of course, users will have an imaging data store 32 that belongs to their user identification where they can store imaging data 34, which is the imaging data store shown in the local computer 12. As a result, the term "personal imaging repository" 26 is meant as a conceptual term for an exchange infrastructure between the imaging data and the available web services on the Internet. Similarly, the term "web" denotes millions of distinct servers that comprise the web, but the web does not actually do anything itself. In the present invention, the servers serving as the composition stores 28 and the imaging data stores 32 are physical implementations of the personal imaging repository as a concept.

As a result, the personal imaging repository 26 becomes the exchange infrastructure for imaging data with the web services that are available on the Internet. When the user requests web services for any of the imaging data 34 stored in the personal imaging repository 26, the requested web service is configured to access the imaging data indicated by the selected imaging composition 30 stored in the personal imaging repository. Put differently, only the selected imaging composition 30 will be serviced by the requested web service.

It should be noted that the personal imaging repository 26 can represent any type of data storage device. In fact, the data storage device 26 does not necessarily have to be located within the local computer 12. The personal imaging repository 26 can be located, for example, on another storage medium, which the local computer can access through alternative communication links. Although it is currently preferred to include the personal imaging repository 26 with the local computer 12, this would likely change as bandwidth becomes faster and the popularity and storage capacity of the personal digital assistant ("PDA") increases. These alternative implementations are contemplated and should be considered within the scope of the present invention.

As shown in the overall network system, the local computer 12 is connected to multiple imaging sources 36 and imaging destinations 38 via a network/communication link 14. In this implementation, the imaging source 36 provides an imaging source service 40 for accessing the personal imaging repository 26, and the imaging destination 38 provides an imaging destination service 42 for servicing the imaging data stored in the personal imaging repository. More specifically, as an example, the imaging destination 38 can be a copying service for printing and binding the printed pages of the imaging data. It is contemplated that all kinds of services can be designed to be implemented with the present invention.

Figure 2:
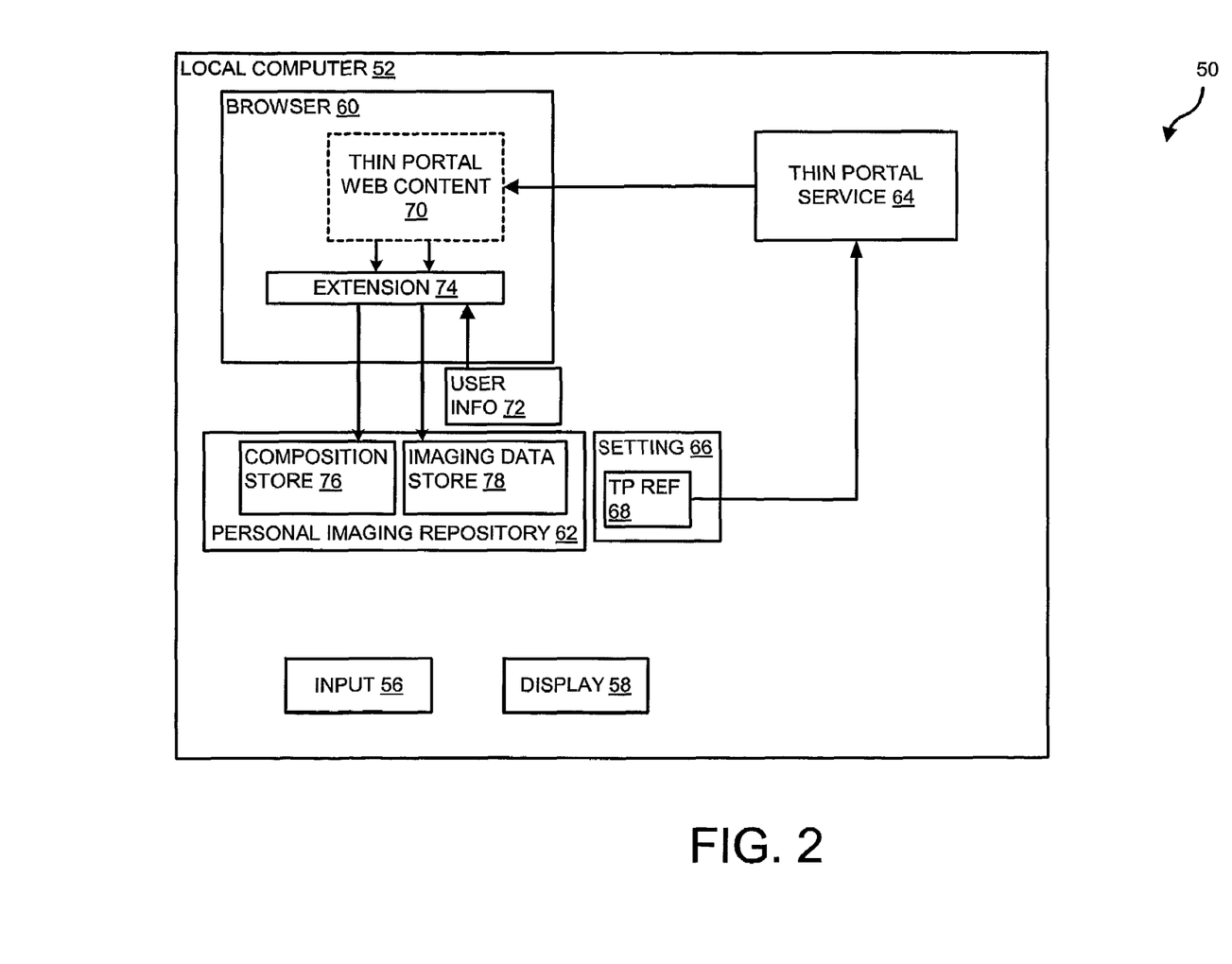
FIG. 2 is an architectural diagram of a preferred implementation of the local computer and the thin portal service.

An architectural diagram of a preferred embodiment of the implementation of the local computer and the thin portal service is shown in FIG. 2 and generally indicated as 50. Similarly, the preferred local computer 52 includes the typical components of a general computer, such as an input interface 56 and a display interface 58. In the preferred implementation, the local computer 52 preferably includes a web browser 60, a personal imaging repository 62 and a thin portal service 64. In addition, the local computer 52 includes setting information 66 with the thin portal reference 68 (i.e., thin portal configurations and settings).

When the thin portal service 64 is requested by the user, the thin portal service, as identified by the thin portal reference 68, finds links to services available to the local computer 52 connected to a specific network. The thin portal reference 68 is useful for users in choosing their thin portal service 64. After finding the available services, the thin portal service 64 returns a thin portal web content 70, including links to the discovered services, to the local computer 12. The thin portal web content 70 is displayed on the web browser 60 to the user. At this point, the user can direct their browsers to access these available services.

The personal imaging repository 62 is associated with a particular user through user information 72 that is preferably accessible using an extension component 74 located on the web browser 60 of the local computer 52. The user information 72 contains information regarding the user's personal imaging repository 62; more specifically, information relating to the composition store 76 and the imaging data store 78 of the personal imaging repository.

Figure 3:
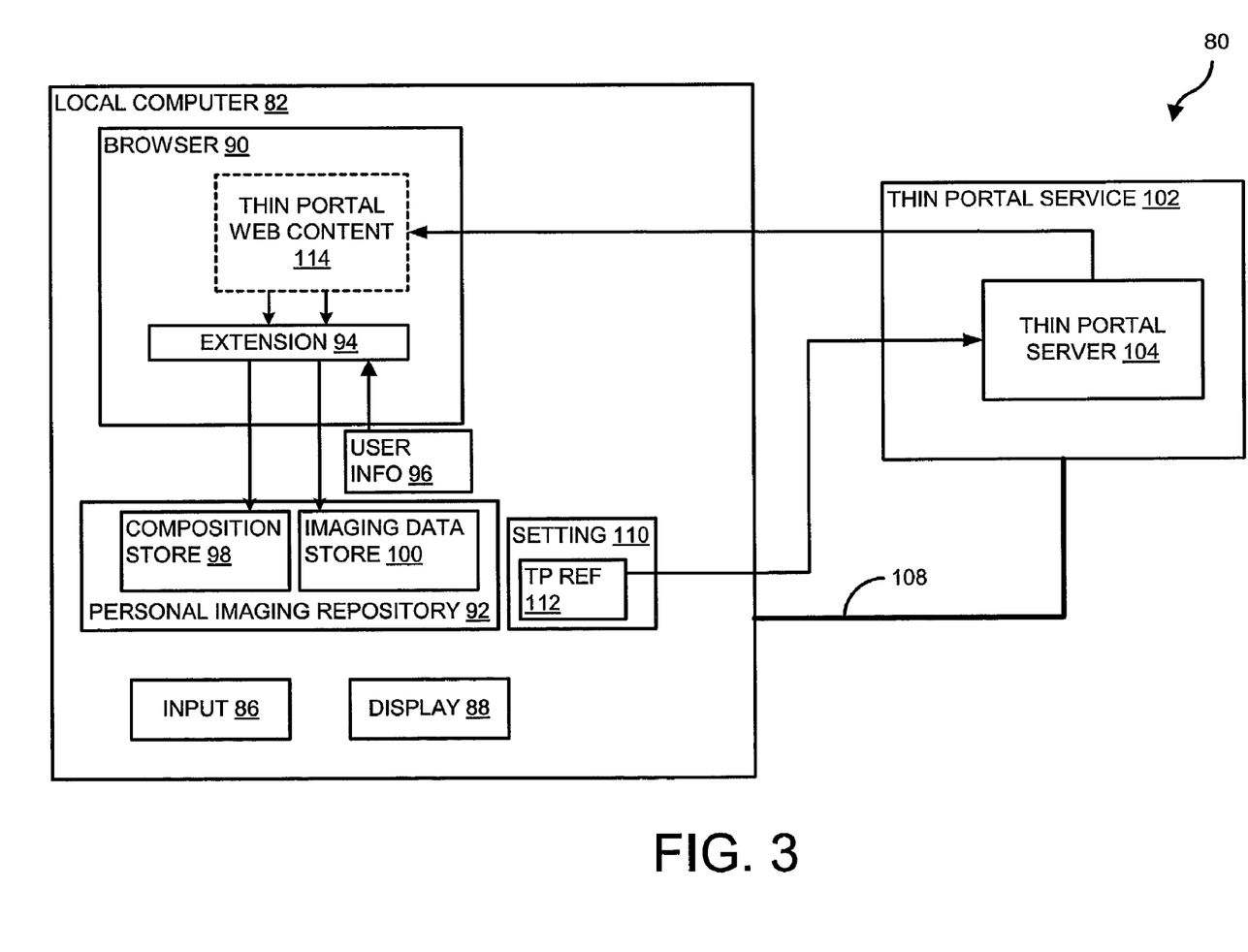
FIG. 3 is an architectural diagram of a second implementation of the local computer and the thin portal service.

An architectural diagram of a second implementation of the local computer and the thin portal service is shown in FIG. 3 and indicated generally as 80. The local computer 82, in this implementation, contains some of the same components as the previous preferred implementation, such as an input interface 86, a display interface 88, a web browser 90 and a personal imaging repository 92. An extension component 94, providing access to user information 96, is similarly included with the web browser 90, and an composition store 98 and an imaging data store 100 of the personal imaging repository 92 are included in the local computer 82. However, as shown, the thin portal service 102 is physically located outside the local computer 82.

In this implementation, the local computer 82 must connect to a thin portal server 104 through a communication/network link 108 to utilize the thin portal service 102. However, it is still preferred that the setting information 110 with the thin portal reference 112 be stored on the local computer 82. When the thin portal service 102 is requested, it finds the services available to the local computer 82 connected to a particular network and returns a thin portal web content 114 with links to the discovered services to the user's browser 90.

Figure 4:
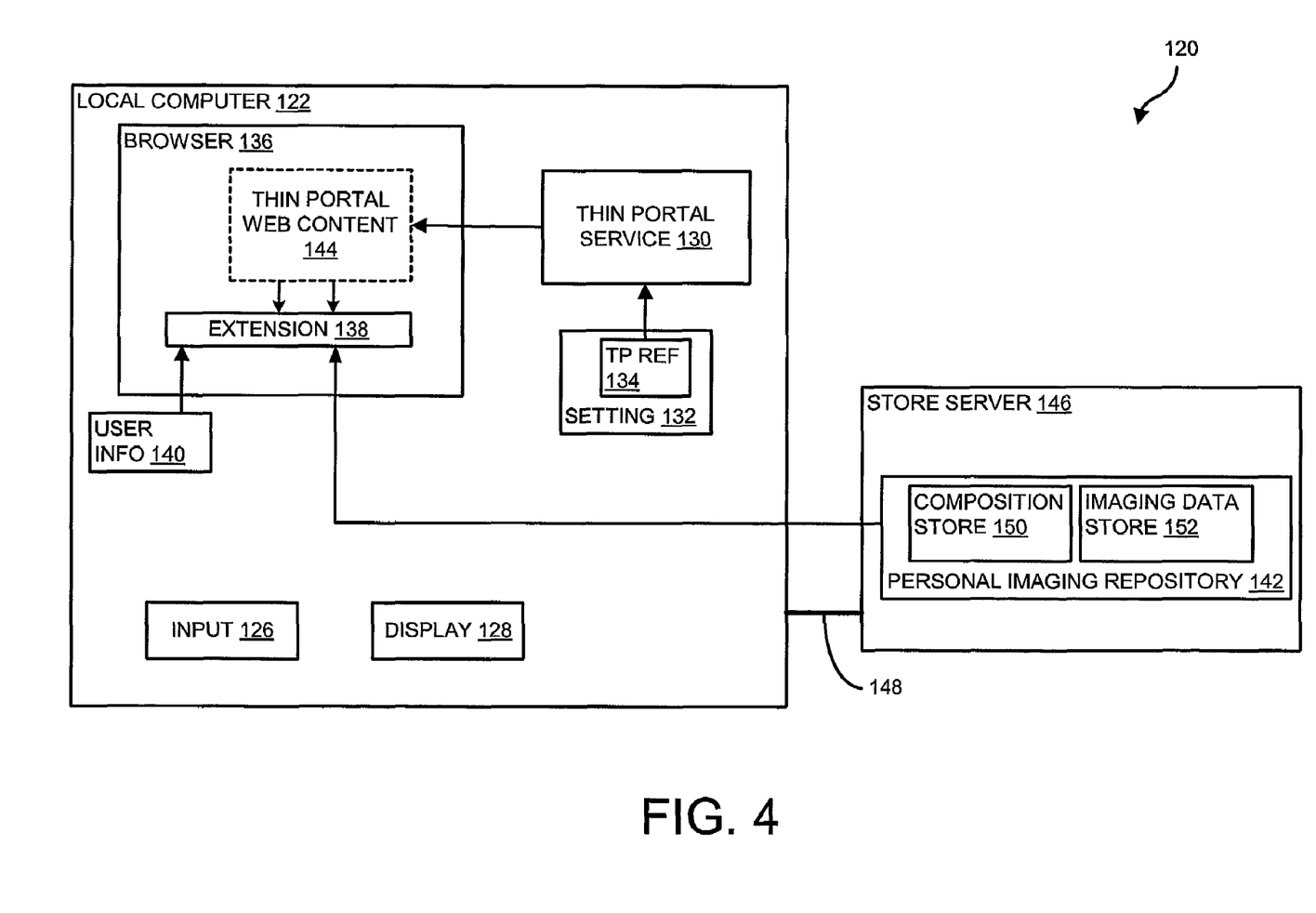
FIG. 4 is an architectural diagram of a third implementation of the local computer and the thin portal service.

A third implementation of the local computer and the thin portal service is shown in FIG. 4, and indicated generally at 120. In this embodiment, the local computer 122 includes the typical components of a general computer, such as an input interface 126, and a display interface 128. In addition, the local computer 122 includes a thin portal service 130 with the setting information 132 used to access the thin portal references 134. Similarly, also found inside the local computer 122 is a web browser 136 with an extension component 138 containing the user information 140 relating to a personal imaging repository 142. A thin portal web content 144 with links to the discovered services is similarly returned to the browser 136 by the thin portal service 130 once the available services have been found.

However, unlike the previous implementation, the personal imaging repository 142 is linked only to the local computer 122. Although it is shown that the personal imaging repository 142 connects to the local computer 122 through a store server 146 via a network connection 148, the personal imaging repository 142 can also be a general data storage device (not shown). The server 146 provides a composition store 150 and an imaging data store 152 of the personal imaging repository to a connected local computer 122 having the user information 140 assigned to it.

Figure 5:
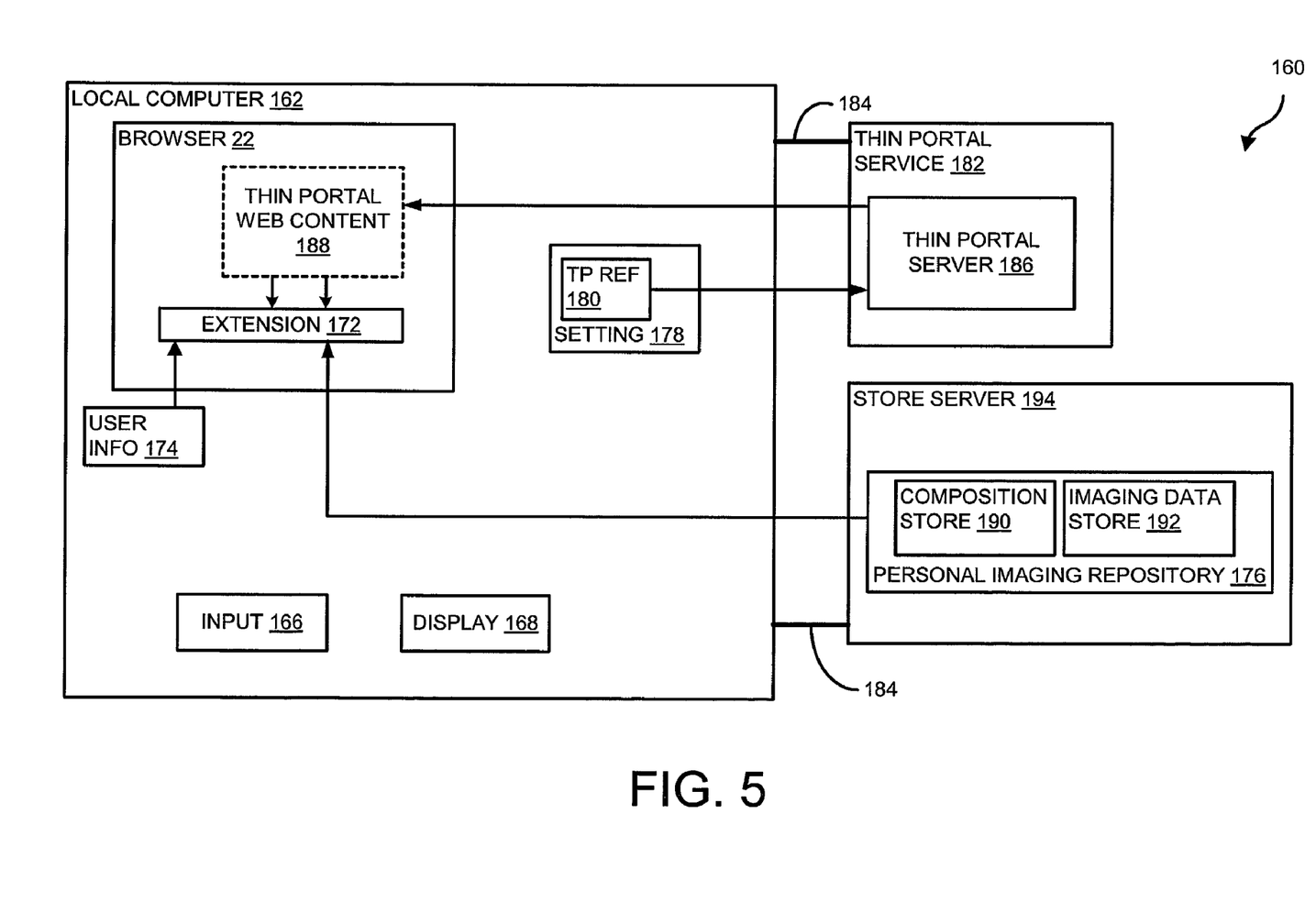
FIG. 5 is an architectural diagram of a fourth implementation of the local computer and the thin portal service; and, FIG. 6 is a flowchart illustrating the preferred functionality of the thin portal method of the present invention.

A fourth implementation of the local computer and the thin portal service is shown in FIG. 5, and indicated generally at 160. The local computer 162 again includes the typical components of a general computer, such as an input interface 166, and a display interface 168. Furthermore, the local computer 162 similarly includes a web browser 170 with an extension component 172 including user information 174 relating to a personal imaging repository 176. Additionally, setting information 178 including thin portal references 180 relating to a thin portal service 182 is stored on the local computer 162.

Both the personal imaging repository 176 and the thin portal service 182 are linked to the local computer 162 through a network/communication link connection 184. As shown, the thin portal service 182 is provided through the use of a thin portal server 186, and similarly returns a thin portal content 188 to the browser 170 once the available services have been found. The personal imaging repository 176, which includes a composition store 190 and an imaging data store 192, is similarly provided to the local computer 162 through a store server 194. The present implementation is more fitted for use with the local computer 162 that is a personal digital assistant ("PDA") or a wireless internet phone device, which generally has very limited memory storage. Because the personal imaging repository 176 and the thin portal service 182 is located on another server 186, 194, minimal memory storage is required on the local computer 162.

Figure 6:
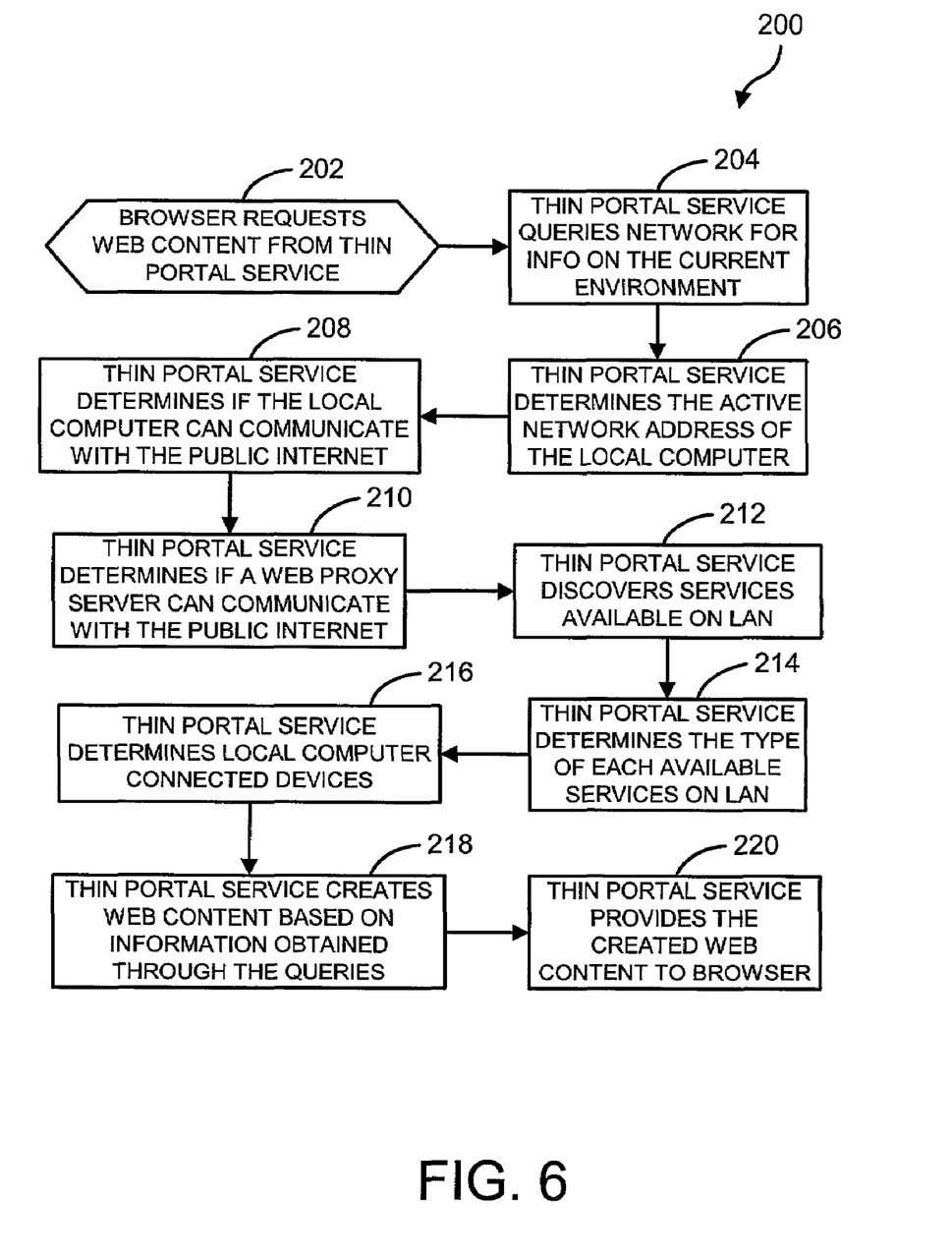

Turning to an important aspect of the present invention, a flow chart of the preferred functionality of the thin portal method is shown in FIG. 6, and indicated generally at 200. The thin portal method is generally initiated by the browser of a local computer requesting web content from the thin portal service (block 202). This request will cause the thin portal service to query the network for information on the current environment of the local computer (block 204). The thin portal service next determines the selected network address(es) of the local computer (block 206), and after which, any Internet communication is preferably determined. More specifically, whether the local computer (block 208) and/or any web proxy service connected to the local computer (block 210) can communicate with the public Internet. The local area network is then preferably checked for any available service(s) (block 212), and the type of these available services, if any of them, are found (block 214). Lastly, the portal service determines if any peripheral device(s) is directly connected to the local computer (block 216). After obtaining the links to the available services to the local computer, the thin portal service creates a thin portal web content based on the information obtained through the queries (block 218) and provides the thin portal web content to the web browser of the local computer. The thin portal web content will include a list of links to the services available to the local computer. Users, as a result, can easily direct their browser to freely utilize any of the listed services.

From the foregoing description, it should be understood that an improved system and method for providing links to services available over a network has been shown and described, which has many desirable attributes and advantages. The system and method provides a way for a local computer, once connected to a network, to find the available services that are available over the network, and display links to the discovered available services in a web content displayed by the user's browser. As a result, users can utilize services available to the laptop computer once connected to the given network environment While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for providing links to services that are available on a local network, the method comprising:
   receiving a request for web content;
   querying the local network for information about a current environment, including checking for devices that are connected to the local network;
   checking for services that are available on the local network by a thin portal service, wherein checking for services comprises checking for services that are available on the local network that are configured to access imaging data stored in a personal imaging repository of a user; and
   creating web content for a network browser, the web content includig at least one link to at least one of said services that is available on the local network;
   wherein said web content provides said services to the user within said current environment without prior configuration of said services on a user computer.

2. The method of claim 1, wherein receiving a request for web content comprises receivig a request form the network browser.

3. The method of claim 1, wherein the request from the network browser is input by a user of the browser.

4. The method of claim 1, wherein checking for services comprises checking for services that are available on the local network that are configured to access imaging data that belongs to a user of a computer on which the browser is executing.

5. The method of claim 1, wherein checking for services comprises determining whether a web proxy service is available on the local network.

6. The method of claim 1, further comprising determining an active network address of a computer on which the browser is executing.

7. A computer program product having program code stored on a computer-readable storage medium, the computer program product comprising;
   program code for querying a local network for information about a current environment, including checking for devices that are connected to the local network;
   program code for checking for services that are available on the local network by a thin portal service, wherein checking for services comprises checking for services that are available on the local network that are configured to access imaging data stored in a personal imaging repository of a user; and
   and program code for creating web content for a network browser, the web content including at least one link to at least one of said services that is available on the local network;
   wherein said web content provides said services to the user within said current environment without prior configuration of said services on a user computer.

8. The system of claim 7, further comprising logic configured to receive a request for web content from the network browser.

9. The system of claim 7, wherein the logic configured to check for services comprises logic configured to check for services that are configured to access imaging data stored in a personal imaging repository of a user of a computer on which the network browser executes.

10. The system of claim 7, wherein the logic configured to check for services comprises logic configured to check for a web proxy service that is available on the local network.

11. The system of claim 7, further comprising logic configured to determine an active network address of a computer on which the browser is executing.

12. A computer, comprising:
A network browser that is configured to receive network content;
a personal imaging repository that is configured to store imaging data; and
a thin portal service that is configured to query a local network to which the computer is connected for information about a current environment, including checking for devices that are connected to the local network, to query for imaging services that are available on the local network and that are configured to access the imaging data of the personal imaging repository of a user, and to create we content for the network browser, the web content including at least one link to at least one of said imaging services that is available on the network;
wherein said web content provides said imaging services to the user within said current environment without prior configuration of said imaging services on a user computer.

13. The computer of claim 12, wherein the personal imaging repository comprises a composition store for storing imaging compositions and an imaging data store that stores imaging data.

14. The computer of claim 13, wherein the composition store comprises link references to imaging data stored in the imaging data store.

15. The computer of claim 12, further comprising a thin portal reference that identifies the thin portal service.

16. The computer of claim 12, further comprising an extension that provides access to content received by the network browser too the personal imaging repository.

17. The computer of claim 16, wherein the extension comprises part of the network browser.

18. The computer of claim 16, wherein the extension accesses the personal imaging repository by referring to user information stored on the computer.

19. The computer of claim 12, wherein the computer is a laptop computer.

20. A system provided on a local network, comprising:
a computer connected to the local network, the computer including a network browser that is configured to receive network content, and a personal imaging repository that is configured to store imaging data; and
a server connected to the local network, the server including a thin portal service that is configured to query the local network for information about a current environment, including checking for devices that are connected to the local network, query for imaging services that are available on the local network and that are configured to access the imaging data of the personal imaging repository of a user, and to create web content for the network browser, the web content including at least one link to at least one of the imaging services that is available on the local network;
wherein said when content provides said imaging services to the user within said current environment without prior configurational of said imaging services on a user computer.

21. A system provided on a local network, comprising:
a computer connected to the local, the copter including a network browser that is configured to receive network content;
a storage server connected to the local network, the storage server including a personal imaging repository that is configured to store imaging data; and
a thin portal server connected to the local network, the thin portal server including a thin portal service that is configured to query the local network for information about a current environment, including checking for devices that are connecting to the local network, query for imaging services that are available on the local network and that are configured to access the imaging data of the personal imaging repository of a user, and to create web content for the network browser, the web content including at least one link to at least one of said imaging services that is available on the local network;
wherein said web content provides said imaging services to the user within said current environment without prior configuration of said imaging services on a user computer.

* * * * *

UNITED STATES PATENT AND TRADEMARK OFFICE
CERTIFICATE OF CORRECTION

PATENT NO. : 7,085,807 B2
APPLICATION NO. : 09/874479
DATED : August 1, 2006
INVENTOR(S) : Shell S. Simpson et al.

It is certified that error appears in the above-identified patent and that said Letters Patent is hereby corrected as shown below:

In column 8, line 28, in Claim 1, delete "includig" and insert -- including --, therefor.

In column 8, line 34, in Claim 2, delete "receivig" and insert -- receiving --, therefor.

In column 8, line 34, in Claim 2, delete "form" and insert -- from --, therefor.

In column 8, line 61, in Claim 7, delete "and" before "program".

In column 9, line 16, in Claim 12, delete "A" before "network browser" and insert -- a --, therefor.

In column 9, line 27, in Claim 12, delete "we" and insert -- web --, therefor.

In column 9, line 30, in Claim 12, insert -- local -- before "network;".

In column 9, lines 36-37, in Claim 13, delete "for storing" and insert -- that stores --, therefor.

In column 9, line 46, in Claim 16, delete "too" and insert -- to --, therefor.

In column 10, line 21, in Claim 20, delete "when" and insert -- web --, therefor.

In column 10, line 23, in Claim 20, delete "configurational" and insert -- configuration --, therefor.

In column 10, line 27, in Claim 21, delete "local," and insert -- local network, --, therefor.

In column 10, line 27, in Claim 21, delete "copter" and insert -- computer --, therefor.

UNITED STATES PATENT AND TRADEMARK OFFICE
CERTIFICATE OF CORRECTION

PATENT NO. : 7,085,807 B2
APPLICATION NO. : 09/874479
DATED : August 1, 2006
INVENTOR(S) : Shell S. Simpson et al.

It is certified that error appears in the above-identified patent and that said Letters Patent is hereby corrected as shown below:

In column 10, line 38, in Claim 21, delete "connecting" and insert -- connected --, therefor.

Signed and Sealed this

Twenty-sixth Day of May, 2009

JOHN DOLL
*Acting Director of the United States Patent and Trademark Office*